United States Patent [19]

Bowdren

[11] Patent Number: 4,560,147

[45] Date of Patent: Dec. 24, 1985

[54] LOW PROFILE STRAP TYPE TURNBUCKLE WITH LOAD BEARING ARTICULATED NUT

[75] Inventor: Brian L. Bowdren, Annapolis, Md.

[73] Assignee: Bowdren, Inc., Annapolis, Md.

[21] Appl. No.: 694,196

[22] Filed: Jan. 23, 1985

[51] Int. Cl.$^4$ ............................................. B66F 3/00
[52] U.S. Cl. ....................................... 254/231; 403/43
[58] Field of Search .................. 403/43, 44, 45, 46, 403/47, 48; 254/231

[56] References Cited

U.S. PATENT DOCUMENTS 1,012,008 12/1911 Post ........................................ 403/46
3,960,359 6/1976 Svahn et al. ........................ 403/43 X

FOREIGN PATENT DOCUMENTS 82115 9/1919 Switzerland ............................ 403/43
550347 1/1943 United Kingdom ................. 403/43

*Primary Examiner*—Andrew V. Kundrat
*Attorney, Agent, or Firm*—Sughrue, Mion, Zinn, Macpeak & Seas

[57] ABSTRACT

A U-strap mounts a nut between the legs of the strap for rotation perpendicular to the longitudinal axis of the strap. The nut is provided with a threaded bore which threadably receives an adjustment sleeve. The adjustment sleeve is also threaded internally reversely to its external threads and threadably receives a stud connected to or constituting a first member to be placed under tension with respect to a second member coupled to or constituting the strap. The turnbuckle is particularly useful in mounting standard wire or rod rigging on a sailboat or sailing yacht.

8 Claims, 4 Drawing Figures

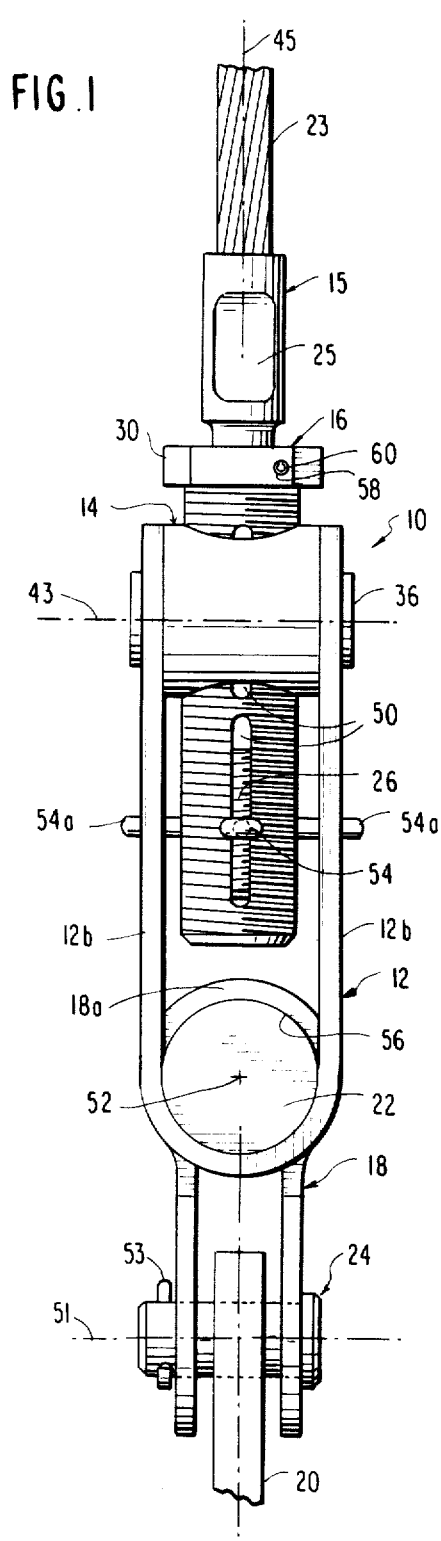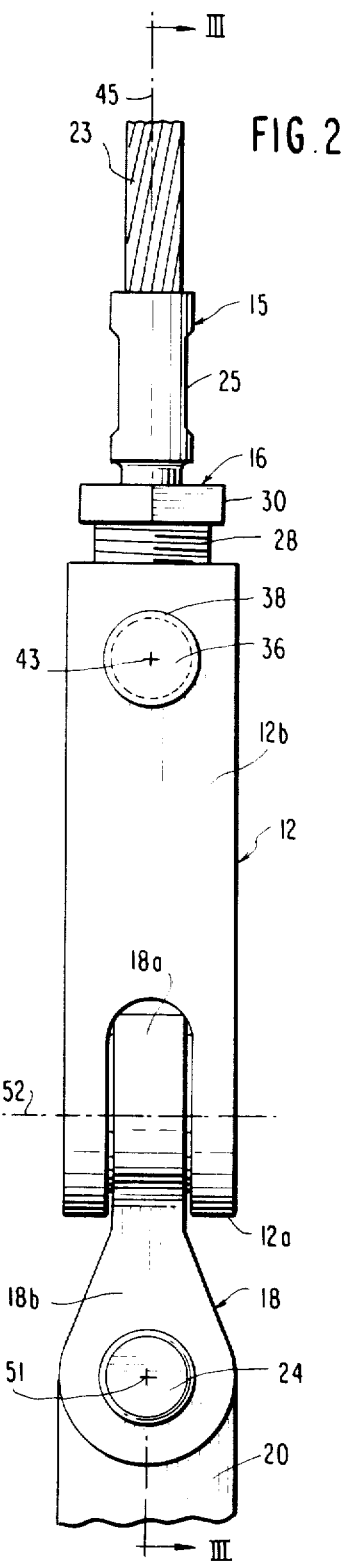

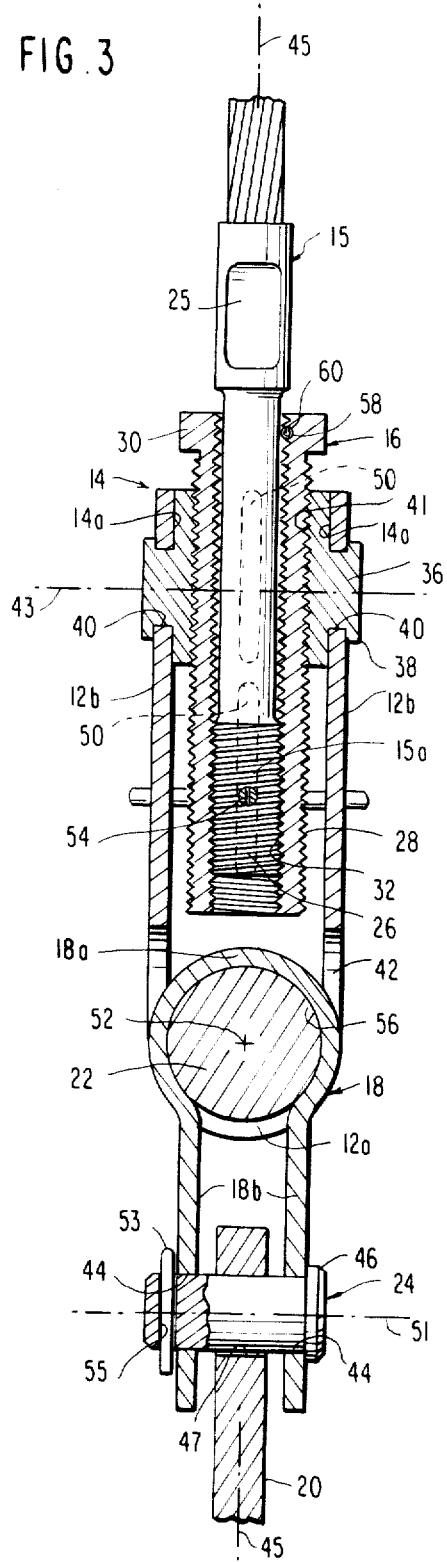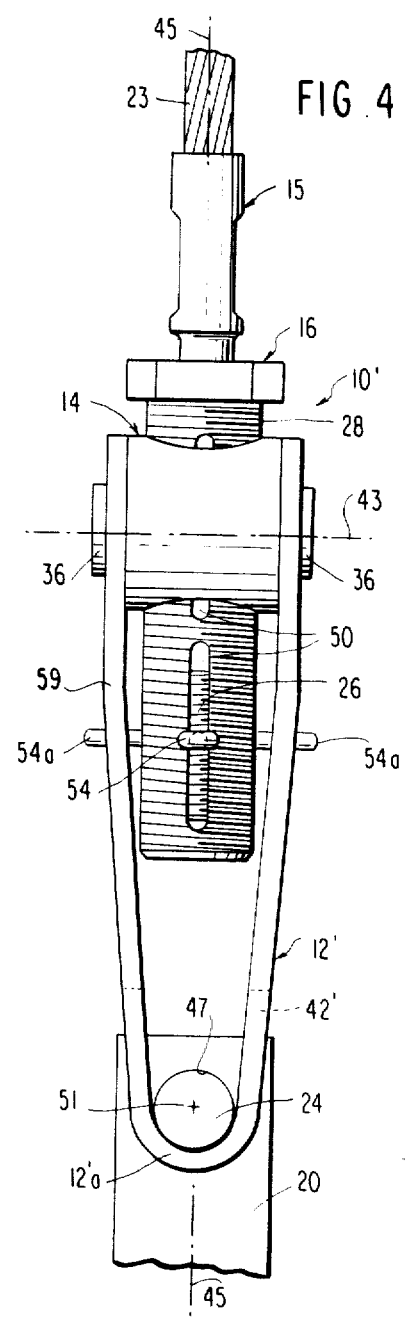

LOW PROFILE STRAP TYPE TURNBUCKLE WITH LOAD BEARING ARTICULATED NUT

FIELD OF THE INVENTION

This invention relates to turnbuckles, and more particularly, to a low profile turnbuckle for adjusting the tension between a hull mounted chain plate and rod rigging in the form of a mast stay or shroud.

The masts of relatively large sailing yachts are supported fore and aft by a head stay and back stay, respectively, and to each side by one or more side stays or shrouds which extend from a point on the mast normally at the top to the deck of the hull bearing the mast. The stays or shrouds may be formed of stainless steel multiple wires helical wound into a unitary cable or by way of solid drawn rod material, each of which must be placed under tension to maintain the mast in an upright position with a predefined fore or aft curvature or lack of curvature, as desired. Typically, the hulls are provided with chain plates to each side thereof in the vicinity of the mast, which chain plates project upwardly and which are integrated to the hull as load bearing members. The mast may have one or more spreaders extending outwardly from both sides of the mast, at longitudinally spaced positions, with the stays or shrouds connected from the deck of the hull via the chain plate to a point on the mast, and across the ends of the spreaders. Typically, a turnbuckle is provided between the chain plate and the lower end of the wire cable or rod stay or shroud to vary the tension exerted on the stay and between the spreader and chain plate. Thus, a predetermined compressive load is exerted on the mast by setting up the desired amount of tension through the shrouds or stays via the turnbuckle. The tension is normally maintained constant while under sail.

Turnbuckles in their infancy took the form of a cast metal open frame or yoke in the form of a pair of laterally spaced side members or arms integrated at their ends by crossbars and terminating in sleeves having axially in line threaded bores. The bores receive, in turn, threaded studs connected to the chain plate and stay or shroud, respectively. Tensioning of the stay or shroud was effected by rotating the yoke or body portion of the turnbuckle to cause by appropriate right or left hand threading for the threaded bores within the sleeves, the axial movement of the internally threaded members towards each other. Of necessity, once proper tension of the shroud or stay was effected, it is necessary to lock the yoke or body relative to the internally threaded members to prevent loss of that tension. This was achieved by several means, one of which was to drill holes within the threaded ends of the internally threaded rodlike members where they protruded into the hollow central section of the yoke, and placed within those holes, cotter pins, rings or the like which also engaged the yoke to prevent their rotation relative to the axially threaded ends of the members threadably mounted to the yoke. Such turnbuckles were effective in producing the tension desired. However, they were relatively massive and heavy, and if the threads of the yoke or body were damaged, the turnbuckle could not perform its function and had to be replaced.

In an effort to improve on this basic turnbuckle, U.S. Pat. No. 1,012,008 to Post issued Dec. 19, 1911, incorporated within the crossbars at opposite ends of the open frame yoke, a pair of rectangular openings, within each of which was positioned a slightly undersized rectangular nut bearing a threaded bore for receiving the threaded end of rods, respectively, making up the turnbuckle assembly. In that structure, the sleeves at the crossbars themselves were not threaded and the threaded connection was made solely through the floating nuts within the ends of the turnbuckle yoke and the rods passing through the nuts. Thus, when the threads and/or the nuts were broken, it was not necessary to discard the complete yoke, but new nuts could be replaced within the pockets receiving the nuts, as needed, and the turnbuckle was again usable.

Turnbuckles such as those discussed previously, including that of Post, are not satisfactory in the rigging of modern sailing yachts, particularly those employed for offshore racing. All of the equipment, including the components of the rigging, must be of very high strength and lightweight, and of small size, that is, minimum profile, since they constitute elements having significant wind resistance and thus tend to slow down the yacht as it is wind driven through the sea. Additionally, because of the propensity for the elements being connected under tension to be misaligned, one with the other, some provision must be made for permitting the tension to be set up through the turnbuckle under conditions in which the misalignment is permitted but without placement of large stresses on the turnbuckle components effecting that tensioned coupling or connection. Additionally, the turnbuckle must include means for effecting a signficant degree of adjustment in the tension between the components being connected under conditions maximizing the extent of travel allowed between the movable components of the turnbuckle, for the overall size of that assembly.

It is, therefore, a primary object of the present invention to provide an improved turnbuckle for use in connecting the shrouds or stays of a sailing yacht to a yacht hull chain plate or the like, which is low in profile, lightweight, and which provides a multi-axis articulated connection between the shroud or stay and the chain plate at respective ends of the turnbuckle.

SUMMARY OF THE INVENTION

The present invention is directed to a lightweight, low profile turnbuckle for applying tension between a shroud or stay and a chain plate or the like of a sailing yacht joined by the turnbuckle. The turnbuckle comprises a U-shaped metal strap comprising a circular center section, integral paired arms extending outwardly of the center section, generally parallel to each other to permit the circular center section to rotatably bear a pin to form a first articulated connection between one of the chain plate and the shroud or stay. A load bearing articulating nut is rotatably mounted between the strap arms remote from the strap center portion for rotation about an axis perpendicular to the longitudinal axis of the strap. A cylindrical adjustment sleeve bearing oppositely threaded threads on its interior and exterior surfaces is threaded to a threaded bore within the adjustment nut and, in turn, a stud operatively connected to one of the shroud and the chain plate, terminates in a threaded end having threads compatible with the internal threads of the sleeve and being threaded internally of the sleeve, such that rotation of the adjustment sleeve causes the sleeve and the threaded end of the stud to move axially through the nut in the direction of the center portion of the strap to apply tension between the chain plate and the shroud or stay as the adjustment sleeve rotates on the threaded end of the stud and internally of the nut. The strap includes an elongated longitudinal slot through the center portion thereof extending into the arms for receiving an end of the chain plate, with the chain plate end including a circular hole therein and a pin carried by the circular center portion of the strap projects through the hole within the chain plate to form an articulated connection at that end of the strap with the chain plate. Alternatively, a U-shaped eye-jaw toggle including a circular base portion of a width smaller than the width of the slot within the strap body at its center portion may have its base portion inserted in the slot, and a cylindrical metal pin may be borne by the eye-jaw toggle circular base portion and the central portion of the strap to form an articulated connection between the toggle and the strap. The toggle may include integral arms extending parallel to each other and away from the base portion with aligned paired holes provided within the toggle arms, and wherein the chain plate includes a circular hole therein and the chain plate projects between the toggle arms and has a circular hole therein aligned with the paired holes of the toggle arms, and a pin projects through the paired holes of the toggle arms and the circular hole within the chain plate for effecting a further articulated connection between the toggle arms and the chain plate. Preferably, the adjustment sleeve includes a radially enlarged head on the end thereof proximate to the stud, with the radially enlarged head being of hexagonal or square plan configuration for permitting coupling to a wrench for effecting rotation of the sleeve and adjustment of the tension provided by the turnbuckle between the shroud or stay and the chain plate connected thereby. The sleeve may include diametrically opposed elongated slots extending parallel to the axis of the sleeve for receiving a locking ring or cotter pin to prevent relative rotation between the sleeve and the strap subsequent to effecting desired tension to the shroud or stay via the turnbuckle.

BRIEF DESCRIPTION OF THE DRAWINGS

FIG. 1 is an end view of a low profile turnbuckle forming one embodiment of the present invention as employed in connecting a stainless steel wire cable shroud to a chain plate.

FIG. 2 is a side elevational view of the turnbuckle of FIG. 1.

FIG. 3 is a vertical sectional view of the turnbuckle of FIG. 2 taken about line III—III.

FIG. 4 is an end view of a low profile turnbuckle, forming a second embodiment of the invention, having a metal strap body directly pin connected to the sailing yacht chain plate.

DESCRIPTION OF THE PREFERRED EMBODIMENTS

Referring first to FIGS. 1, 2 and 3, the low profile turnbuckle constituting one embodiment of the present invention is indicated generally at 10. The low profile turnbuckle is comprised principally of a stainless strap or body 12, a stainless steel nut 14, and a bronze adjustment sleeve 16 which is threaded externally to nut 14 and bears threadably on its internal threaded bore the end of a standard swaged on right hand stud 15. Alternatively, the turnbuckle has a particular application for rod rigging, in which an adaptor housing the rods cold head will be threaded onto the end of the stud or the stud will be deep-drilled to receive the rod which is cold headed at the extreme end. In this embodiment, an eye-jaw toggle 18, which pin mounts via pin 24 to chain plate 20, is, in turn, articulated by pin 22 to the steel strap body 12. This forms a compact assembly creating a triple articulation via nut 14, pin 22, and pin 24 about orthogonal axes.

A stainless steel wire rope or cable 23 is swaged to stud 15, using a conventional swaging tool, onto and internally of stud 15, thereby effecting a swaged connection at 25. The stud 15 is a standard swaged on stud bearing externally right hand threads as at 26 on the periphery of the same and over an end 15a of the stud. Bronze adjustment sleeve 16 is of elongated cylindrical form and is formed with a headed or radially enlarged end 30 of hexagonal or square cross-section, permitting a wrench or the like to be employed at this point for effecting tension through the turnbuckle 10. The bronze adjustment sleeve 16 is provided with external left hand threads at 28 and internal right hand threads at 32 with the diameter of threaded section or portion 15a of the stud 15 approximating that of the internal bore of the bronze adjustment sleeve 16.

The stainless steel nut 14 takes the form of a cylindrical block including laterally opposed sidewalls 14a from which project integrally paired cylindrical bosses 36 of a diameter being slightly less than the diameter of a pair of circular holes 40 which are diammetrically formed within opposed arms 12b of the stainless steel strap body 12, through which the bosses 36 project. In the embodiment of FIGS. 1-3, the bosses 36 are cold headed as at 38 to maintain the arms 12b of the stainless steel strap body 12 parallel and supporting nut 14, adjustment sleeve 16, and stud 15. Alternatively, washers may be welded to the ends of projecting bosses 36 to form radial enlargements to maintain the nut rotatably mounted to the stainless steel strap body 12. The same effect may be accomplished by drilling holes within bosses 36 for placement of cotter pins or by threading of the bosses to permit the bosses to carry nuts to maintain the rotatable engagement between supporting nut 14 and the arms 12b of the stainless steel strap body 12. The nut 14 is provided with a threaded bore 41, the threads of which are left handed and matching those of the left handed external thread 28 of the bronze adjustment sleeve 16. Preferably, the nut 14 is articulated to the steel strap body 12 so as to rotate about axis 43 which is perpendicular to the longitudinal axis 45 of the turnbuckle 10, which axis 45 is also common to nut 14, adjustment sleeve 16 and stud 15.

The arms 12b of the steel strap or body 12 are joined remote from the ends bearing holes 40 by a strap circular center portion or section 12a and strap 12 is provided with a generally rectangular slot 42 at that end, extending into arms 12b. Slot 42 receives the cylindrical base portion 18a of the eye-jaw toggle 18 whose arms 18b extend, parallel to each other, beyond the steel strap body 12 and away from the connection of the strap body to stud 15 to make a pin connection with chain plate 20 of the sailing yacht bearing turnbuckle 10. The chain plate 20 is constituted by a vertical, stainless steel or other metal strap extending upwardly from the ship's hull (not shown) and bearing a circular hole 47 whose axis 51 is horizontal. The arms 18b of the eye-jaw toggle 18 are provided with aligned circular holes 44 through which projects a pin 24 which also passes through the aligned hole 47 of chain plate 20. The pin 24 is held in position by its headed end 46 and by means of a cotter pin as at 53 passing through hole 55 within pin 24, to the opposite side of the toggle 18 from headed end 46.

The cylindrical base portion 18a of toggle 18 has a cylindrical bore 55 within which is rotatably positioned an oversized cylindrical pin 22 which pin 22 also passes through the stainless steel strap 12 and which may be fixed at its ends to the center portion or section 12a of that strap 12. As may be appreciated, once the connection is made, as shown in FIGS. 1 through 3 inclusive, tension is applied between the chain plate 20 and the stainess steel wire cable or rope 23 by the simple expedient of rotating the bronze adjustment sleeve 16. Since that sleeve has right hand internal threads and left hand external threads, during its rotation, it will draw the threaded end 15a of stud 15 into the interior of the nut 14 articulated to the steel strap 12 under conditions in which neither the strap 12 nor the stud 15 is driven about the longitudinal axis 45 because of the oppositely directed threads on the internal bore and exterior of the bronze adjustment sleeve 16. Triple articulation occurs, as perhaps best seen in FIG. 3, about pivot axis 43 for bosses 36 of the nut 14, axis 51 of the pin 24 rotatably connecting the toggle 18 to chain plate 20 and axis 52 of oversized pin 22, rotatably conecting the toggle 18 to steel strap 12.

During rotation of the adjustment sleeve 16, the adjustment sleeve 16 tends to penetrate axially into the interior of the nut 14, while simultaneously the threaded end 15a of stud 15 is driven axially into the threaded interior bore of the adjustment sleeve 16. In FIGS. 1 through 3 inclusive, the stud 15 and thus the stainless steel wire cable or wire rope 23 is under maximum tension applied by the turnbuckle on the shroud or stay defined by the wire cable or rope 23.

The bronze adjustment sleeve 16 is provided with diametrically opposed longitudinally separated slots 50, through which a cotter pin 54 indicated in FIGS. 1-3 inclusive passes, which cotter pin ends 54a extends beyond the strap arms 12b to prevent rotation of the sleeve 16 after tension is effected so as to maintain the turnbuckle components in their adjusted state and suitable tension applied to the stainless steel wire cable or wire rope 23 swaged to stud 15. Cotter pin 54 may also pass through a drilled transverse hole within the threaded end of stud 15 to lock all three elements, the strap or body 12, sleeve 16 and stud 15. Other alternative means may be employed for physically locking the rotatable bronze adjustment sleeve in adjusted position and maintaining the tension applied through the turnbuckle to the stainless steel wire rope or solid rod rigging component.

Reference to FIG. 4, shows an alternative form of low profile strap turnbuckle 10' with load bearing articulated nut forming a second embodiment of the invention, and wherein like elements have like numerical designations, while those of modified form are provided with prime designations. In this respect, the turnbuckle 10' eliminates the use of an eye-jaw toggle and utilizes a modified stainless steel strap or body indicated generally at 12' for making a direct connection to chain plate 20 (or its equivalent) via pin 24. A standard swaged on right hand threaded stud 15 is identical to that of the first embodiment and may be swaged to a standard stainless steel wire cable or wire rope as at 23, or swaged or otherwise connected to the end of standard solid stainless steel metal rigging rod. Further, bronze adjustment sleeve 16 is identical to that of the first embodiment, and includes a threaded internal bore having right hand threads matching those at 32 of stud 15 which it threadably receives. Additionally, it is threaded on its exterior as at 28 by which it is threadably borne by nut 14.

Nut 14 is identical to that of the first embodiment and the functional equivalent. This embodiment elminates the eye-jaw toggle 18 of the prior embodiment, and is even slimmer in profile, all of which is achieved by creating a narrower stainless strap or body circular center section 12a; whose diameter is slightly larger than the diameter of pin 24 which is positioned therein and which extends through hole 47 within the chain plate 20m of slightly larger diameter to that of pin 24. The chain plate 20 projects upwardly within rectangular slot 42' of strap 12' which is essentially the same as that as shown in FIG. 3, permitting the chain plate 20 to penetrate into the steel strap or body 12'.

Each of arms 12'b of the steel strap body 12' are parallel to each other, at nut 14, and at right angles to the axis 43 of bosses 36 forming the articulated connection between the stainless nut 14 and the paired arms 12'b of the stainless steel strap body 12'. Holes (not shown) but identical to those at 40 in the first embodiment provide for a rotatable connection of nut 14 relative to the laterally 30 opposed arms 12'b of steel strap body 12'. Beyond nut 14, the arms 12'b are bent as at 59, narrowing towards strap center portion 12'a which is sized to closely receive pin 24 for direct pin connection of the turnbuckle steel strap or body 12' to chain plate 20. Diametrically opposed slots 50 within adjustment sleeve 16 receive cotter pin 54 whose ends 54a, function to lock the adjustment sleeve against rotation once tension is applied to the stay or shroud via stud 15.

While it is possible to insure articulated connection of the nut 14 to the stainless strap body 12 by cold heading the projecting ends of bosses 36 as at 38 alternatives may be employed. One alternate arrangement may utilizing snap rings fitted within circumferential grooves within the projecting ends of the bosses 36. Alternatively, a slot and key arrangement may be utilzed to effect that articulated connection. Preferably, as shown in FIGS. 1 and 3, stud 15 is not threaded over its entire length, as a long thread engagement causes too much friction, a tangentially drilled hole 58 in the head 30 of adjustment sleeve 16 receives a roll pin 60 preventing the stud 15 from completely unscrewing from the adjustment sleeve.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A lightweight, low profile turnbuckle for applying tension between a shroud or stay and chain plate or the like of a sailing yacht joined by said turnbuckle, said turnbuckle comprising:

a U-shaped metal strap comprising a circular center section, integral paired arms extending outwardly of said center section generally parallel to each other, permitting said circular center section to rotatably bear a pin and forming a first articulated connection between one of said chain plate and said shroud or stay, a load bearing articulating nut mounted between said strap arms remote from said strap center portion for rotation about an axis perpendicular to the longitudinal axis of said strap, a cylindrical adjustment sleeve bearing opposite threads on interior and exterior surfaces thereof, said nut including a threaded bore threadably receiving said adjustment sleeve, a stud operatively connected to one of said shroud or stay and said chain plate and terminating in a threaded end having threads compatible with the internal threads of said sleeve and being threaded internally of the sleeve such that rotation of said adjustment sleeve causes said sleeve and said threaded end of said stud to move axially through said nut in the direction of said center portion of said strap to apply tension between said chain plate and said shroud or stay as said adjustment sleeve rotates on said threaded end of said stud and internally of said nut.

2. The lightweight, low profile turnbuckle as claimed in claim 1, wherein said strap includes an elongated longitudinal slot through the center portion thereof and extending into said arms for receiving an end of said chain plate, said chain plate end includes a circlar hole therein, and a pin carried by said circular center portion of said strap projects through said hole within said chain plate to form an articulated connection at that end of said strap with said chain plate.

3. The lightweight, low profile turnbuckle as claimed in claim 1, wherein said strap body at its center portion includes an elongated slot extending partially within said arm remote from said load bearing articulating nut, a U-shaped eye-jaw toggle including a circular base portion of a width smaller than the width of said slot has its base portion inserted in said slot, a cylindrical metal pin is borne by said eye-jaw toggle circular base portion and said central portion of said strap to form an articulated connection between said toggle and said strap body, and wherein said toggle includes integral arms extending parallel to each other and away from said base portion, aligned paired holes being provided within said toggle arms and wherein said chain plate includes a circular hole therein and said chain plate projects between said toggle arms, has the circular hole therein aligned with the paired holes of said toggle arms and a pin projects through the paired holes of said toggle arms and the circular hole within the chain plate for effecting an articulated connection between said toggle arms and said chain plate.

4. The lightweight, low profile turnbuckle as claimed in claim 3, wherein said adjustment sleeve includes a radially enlarged head on the end thereof proximate to said stud, and wherein said radially enlarged head is of square plan configuration for permitting coupling to a wrench for effecting rotation of the sleeve and adjustment of the tension provided by said turnbuckle between the shroud or stay and the chain plate connected thereby.

5. The lightweight, low profile turnbuckle as claimed in claim 1, wherein said adjustment sleeve includes at least one pair of diametrically opposite slots extending longitudinally therein, and said stud threaded end includes a transverse hole therein for permitting penetration of a cotter pin, locking ring or the like therethrough to effect an interference between the adjustment sleeve and said strap to lock the turnbuckle after adjustment of the turnbuckle to effect a desired tension to said shroud or stay.

6. The lightweight, low profile turnbuckle as claimed in claim 2, wherein said adjustment sleeve includes at least one pair of diametrically opposite slots extending longitudinally therein for permitting penetration of a cotter pin, locking ring or the like therethrough to effect an interference between the adjustment sleeve and said strap to lock the turnbuckle after adjustment of the turnbuckle to effect a desired tension to said shroud or stay.

7. The lightweight, low profile turnbuckle as claimed in claim 3, wherein said adjustment sleeve includes at least one pair of diametrically opposite slots extending longitudinally therein for permitting penetration of a cotter pin, locking ring or the like therethrough to effect an interference between the adjustment sleeve and said strap to lock the turnbuckle after adjustment of the turnbuckle to effect a desired tension to said shroud or stay.

8. The lightweight, low profile turnbuckle as claimed in claim 4, wherein said adjustment sleeve includes at least one pair of diametrically opposite slots extending longitudinally therein for permitting penetration of a cotter pin, locking ring or the like therethrough to effect an interference between the adjustment sleeve and said strap to lock the turnbuckle after adjustment of the turnbuckle to effect a desired tension to said shroud or stay.

* * * * *